(12) United States Patent
Maruta et al.

(10) Patent No.: US 6,245,459 B1
(45) Date of Patent: Jun. 12, 2001

(54) SUBSTRATE FOR ALKALINE STORAGE BATTERY, PROCESS FOR PRODUCING THE SAME AND ALKALINE STORAGE BATTERY

(75) Inventors: Masayoshi Maruta, Kamakura; Masato Onishi; Fumihiko Yoshii, both of Fujisawa; Tetsushi Kajikawa, Kamakura, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/080,286

(22) Filed: May 18, 1998

(30) Foreign Application Priority Data

Jun. 3, 1997 (JP) .................................................. 9-144872

(51) Int. Cl.$^7$ ...................................................... H01M 4/32
(52) U.S. Cl. ............................................ 429/223; 29/623.1
(58) Field of Search ................................ 429/223, 218.1; 29/623.1

(56) References Cited

U.S. PATENT DOCUMENTS

| | | | |
|---|---|---|---|
| 5,200,282 | * | 4/1993 | Ohnishi et al. ............................ 429/223 |
| 5,523,182 | * | 6/1996 | Ovshinsky et al. ....................... 429/223 |
| 5,672,447 | * | 9/1997 | Yamawaki et al. ....................... 429/223 |
| 5,735,913 | * | 4/1998 | Borthomieu ............................ 29/623.1 |
| 5,759,718 | * | 6/1998 | Yao et al. ................................ 429/223 |
| 5,876,874 | * | 3/1999 | Furukawa ................................ 429/223 |

FOREIGN PATENT DOCUMENTS

| | | |
|---|---|---|
| 0353837 | 2/1990 | (EP) . |
| 0360863 | 4/1990 | (EP) . |
| 0403052 | 12/1990 | (EP) . |
| 59-96659 | 6/1984 | (JP) . |
| 63-216268 | 9/1988 | (JP) . |
| 9705666 | 2/1997 | (WO) . |

\* cited by examiner

*Primary Examiner*—Carol Chaney
(74) *Attorney, Agent, or Firm*—Stevens, Davis, Miller & Mosher, L.L.P.

(57) ABSTRACT

An improved sintered nickel porous plaque substrate for alkaline storage batteries is prepared by a process which includes coating the surface of the sintered nickel powder with a nickel oxyhydroxide coating by anode oxidation in an alkali solution, then attaching a cobalt salt to the nickel oxyhydroxide coating and, while subjecting the cobalt salt to an alkali conversion treatment, through an oxidation-reduction reaction between nickel oxyhydroxide and cobalt hydroxide, converting the nickel oxyhydroxide coating into a nickel hydroxide coating and forming a cobalt oxyhydroxide layer as a uniform film on the outside of the nickel hydroxide coating.

19 Claims, 5 Drawing Sheets

SUBSTRATE FOR ALKALINE STORAGE BATTERY, PROCESS FOR PRODUCING THE SAME AND ALKALINE STORAGE BATTERY

BACKGROUND ART

1. Field of the Invention

The present invention relates to an improvement in a nickel positive electrode used for alkaline storage batteries, such as nickel-cadmium storage batteries and nickel-metal hydride storage batteries. In more particular, it relates to an improvement in sintered nickel substrates used as the electrode base of these batteries.

2. Description of the Related Art

In general, the positive electrode plate used for alkaline storage batteries discharged at a large electric current and charged in a short time, namely storage batteries for so-called high-rate charge and discharge, is a sintered nickel electrode which has a low internal resistance and has excellent cycle life characteristics. The sintered nickel electrode is produced as follows. A sintered nickel porous plaque substrate used as the support for an active material is prepared by coating carbonyl nickel powder on a core material, followed by sintering at high temperature. The substrate is then dipped in an acidic solution of a nickel salt, such as nickel nitrate. Then the substrate is dipped in an aqueous alkali solution to convert the nickel salt impregnating the pores into nickel hydroxide. The above-mentioned series of active material filling operations is repeated several times until a desired amount of the active material is obtained.

The reason for repeating the filling operation is that only one active material filling operation is insufficient to give a desired amount of the active material. Therefore, the desired amount of the active material is filled by repeating the filling operation several times. It is already known, in order to increase the efficiency of filling the active material into the substrate to reduce the number times that the filling operation is preformed and thereby simplify the electrode production steps, to increase the concentration of the nickel salt, e.g. nickel nitrate, used in its aqueous solution thereby increasing the amount of active material filled into the substrate by one filling operation.

The concentration of nickel nitrate in its aqueous solution can be kept high by heating the aqueous solution to a high temperature, whereby the solubility of the salt increases and a specific gravity of the solution of 1.7–1.8 can be reached.

However, an aqueous nickel nitrate solution of such a high concentration has a low pH and hence, owing additionally to its high temperature, is highly corrosive to metals. When a sintered nickel substrate is dipped in such a solution for a long time, the nickel metal constituting the substrate goes into solution by corrosion, and the mechanical strength as a sintered body is decreased.

Therefore, when a battery using a positive electrode plate constituted of a sintered nickel substrate which has received such a treatment is subjected to repeated charge and discharge, since the charge-discharge reaction accompanies the swelling and shrinkage of the active material, the substrate with a lowered mechanical strength is partly broken and/or widened by the swelling of the active material, and hence the nickel electrode readily swells. Consequently, the pore volume of the swollen positive electrode plate increases, the electrolyte held in the separator is taken into the enlarged pores, and the amount of the electrolyte in the separator relatively decreases.

As a result, the separator comes to be exhausted of the electrolyte, which increases the resistance at the time of battery reaction and causes deterioration of the discharge characteristic. The above-mentioned phenomena proceed with the progress of the charge-discharge cycle of the battery, resulting in marked deterioration of the battery capacity.

In recent years, batteries with higher energy density have been eagerly desired and consequently the use of high porosity sintered nickel substrates has become necessary. Accordingly, it has been attempted to attain a high energy density by using a high porosity substrate having a high proportion of pore part obtained by reducing the amount of nickel used, dipping the substrate in an acidic aqueous nickel salt solution of high temperature and high concentration to increase the filled amount of active material, and further conducting the above-mentioned filling operation a number of times.

However, since the amount of nickel constituting such a substrate is small, the sintered substrate has a low mechanical strength. Moreover, since a corrosive, high temperature, acidic aqueous nickel salt solution is used, the thin skeleton of the sintered nickel body is readily deteriorated in its mechanical strength even with a small amount of corrosion, and the electrode prepared by such a method is poor in durability. Accordingly, when the electrode is used to prepare an alkaline storage battery having a high energy density, the battery is liable to undergo marked deterioration of capacity in the charge-discharge cycles of the battery.

To solve the above-mentioned problem, it has been proposed in JP-A-59-96659 to form oxidation-resistant nickel oxide on the surface of sintered nickel of a sintered nickel substrate by heating the substrate at high temperature in the presence of oxygen, in order to prevent the corrosion of the substrate. However, this method also has a problem. When the amount of nickel oxide formed is small a sufficient corrosion preventive effect cannot be obtained and the corrosion of the substrate cannot be suppressed sufficiently. On the contrary, when the amount of nickel oxide formed is increased, the corrosion of the substrate can be suppressed but, since nickel oxide itself is poor in electric conductivity, the increase results, materially, in the existence of a semiconductor or a non-conductor between the active material and the substrate and hence the conductivity between the two is greatly decreased. As a result, the utilization factor of the active material when used in an electrode is lowered.

JP-A-63-216268 discloses a method of preventing the corrosion of a sintered nickel substrate itself by forming a layer of cobalt oxide on the surface of the substrate. In this method, however, a considerable amount of cobalt oxide must be added to suppress the corrosion of the substrate sufficiently, whereas when the amount of cobalt is small the formation of the coating layer is incomplete and the corrosion cannot be prevented effectively.

Thus, in order for the cobalt oxide layer to act effectively for preventing the corrosion of a sintered substrate, it is important that the whole of the sintered nickel porous plaque substrate, including its internal and external skeletons, is coated closely without leaving a gap. When the cobalt oxide layer has a pinhole in some parts thereof, corrosion of the substrate skeleton proceeds from the parts. In a sintered nickel substrate, if even a part thereof is corroded, the potential of the substrate lowers to reach the dissolution potential of nickel, and corrosion proceeds over the whole of the substrate.

For example, one of the methods used for coating the surface of a sintered nickel substrate with a cobalt oxide layer comprises forming on the surface of a sintered nickel substrate cobalt hydroxide in the form of fine particles and then converting the hydroxide into cobalt oxide by heat treatment. Since the reaction is proceeded in the state of particles in this method, pinholes develop inevitably in the cobalt oxide layer. Consequently, the sintered nickel substrate is corroded starting from the pinhole parts of the oxide layer. Protecting the sintered nickel substrate effectively from corrosion cannot be attained unless the cobalt oxide is attached to the substrate in such a large amount as to adversely affect the electric properties of the resulting substrate, particularly the voltage characteristic.

Another method used for forming the cobalt oxide layer comprises dipping a sintered nickel substrate in an acidic aqueous solution of a cobalt salt, such as cobalt nitrate, followed by drying, then dipping the substrate in an aqueous alkaline solution to effect conversion of the cobalt salt into cobalt hydroxide, and then heating the substrate to effect oxidation of the hydroxide. In this way, a cobalt oxide layer can be formed on the surface of nickel constituting the sintered nickel substrate, but the oxide layer formed is sometimes non-uniform and develops pinholes. Moreover, the use of an acidic aqueous cobalt salt solution causes the corrosion of the sintered nickel body in the steps of dipping and subsequent drying.

SUMMARY OF THE INVENTION

In order to overcome the aforementioned problems associated with conventional technology, the main object of the present invention is to provide, an alkaline storage battery which exhibits a good utilization factor of the positive electrode active material without substantially lowering the operating voltage at the time of discharge. This object is achieved by preventing the corrosion of a sintered nickel substrate while simultaneously improving its electroconductivity and incorporating an electrode using the resulting substrate into an alkaline storage battery.

To attain the above-mentioned object, the present invention uses, as the sintered nickel porous plaque substrate used as the base of the positive electrode, a substrate wherein the surface of the sintered nickel is covered with a nickel hydroxide coating and a cobalt oxyhydroxide layer is further formed on the outside of the nickel hydroxide coating.

The first object of the present invention is to provide a sintered nickel substrate for alkaline storage batteries wherein the whole of the surface of the sintered nickel is covered with a nickel hydroxide coating and a cobalt oxyhydroxide layer is further formed on the outside of the nickel hydroxide coating.

By forming a nickel hydroxide coating on the surface of the sintered nickel constituting the sintered substrate, the desirable effect of preventing the corrosion of the nickel skeleton can be obtained, and cobalt salts, which are highly corrosive, can be used in the step of forming a cobalt oxyhydroxide layer on the outside of the nickel hydroxide coating. Moreover, the resulting substrate has improved electric conductivity since it is provided on the outermost surface with a cobalt oxyhydroxide layer.

The second object of the present invention is to provide a nickel positive electrode for alkaline storage batteries obtained by subjecting a sintered nickel porous plaque substrate, wherein the whole of the surface of the sintered nickel constituting the substrate is covered with a nickel hydroxide coating, and a cobalt oxyhydroxide layer is further formed on the outside of the coating to a series of active material filling operations. The operations comprise dipping the substrate in an acidic aqueous nickel salt solution, followed by drying, and then dipping the substrate in an aqueous alkali solution to effect conversion of the nickel salt into nickel hydroxide.

Since a sintered nickel porous plaque substrate excellent in corrosion resistance is used, filling operations can be conducted a number of times using a high concentration, high temperature aqueous nickel salt solution, and thereby a nickel positive electrode with a high filling density can be obtained.

The third object of the present invention is to provide an alkaline storage battery constructed essentially of the above-mentioned nickel positive electrode, a negative electrode, a separator and an alkaline electrolyte. The positive electrode comprises a sintered nickel porous plaque substrate filled with an active material, the whole of the surface of the sintered nickel constituting the substrate being covered with a nickel hydroxide coating, and a cobalt oxyhydroxide layer being further formed on the outside of the nickel hydroxide coating.

Since a sintered nickel porous plaque substrate excellent in corrosion resistance and electro-conductivity is used, the corrosion of the substrate can be prevented while a good conductivity is maintained, the operating voltage at the time of discharge does not materially lower, and a good utilization of the positive electrode active material can be attained.

The fourth object of the present invention is to provide a process for producing a sintered nickel substrate for alkaline storage batteries which comprises subjecting a sintered nickel porous plaque substrate to anode oxidation in an aqueous alkali solution to form a nickel oxyhydroxide coating on the surface of the sintered nickel, then attaching a cobalt salt to the surface of the nickel oxyhydroxide and, while subjecting the cobalt salt to an alkali conversion treatment, through an oxidation-reduction reaction between nickel oxyhydroxide and cobalt hydroxide, converting the nickel oxyhydroxide coating into a nickel hydroxide coating and forming a cobalt oxyhydroxide layer on the outside of the nickel hydroxide coating.

Thus, by forming a nickel oxyhydroxide coating on the surface of the nickel constituting the sintered substrate, the nickel skeleton of the substrate is effectively prevented from corroding during the step of forming a cobalt oxyhydroxide layer. Furthermore, the nickel oxyhydroxide coating attracts cobaltic acid ions to its outside and causes oxidation and reduction reactions simultaneously, whereby the cobalt oxyhydroxide coating is converted to a nickel hydroxide coating and further a uniform cobalt oxyhydroxide layer can be formed on the outside of the nickel oxyhydroxide coating.

DETAILED DESCRIPTION OF THE INVENTION

The present invention is described in detail below with reference to the Example and the accompanying drawings, but the invention is not to be limited by the Example.

EXAMPLE

On both surfaces of a porous conductive core material 1 formed of a nickel-plated iron sheet 60 μm in thickness was coated a slurry comprising mainly nickel powder 2. The coated sheet was dried and then subjected to a sintering treatment of keeping the sheet in a reducing atmosphere at 1000° C. for 5 minutes, to sinter the nickel powder 2. Thus, a sintered nickel substrate with a porosity of about 85% was prepared.

Figure 1:
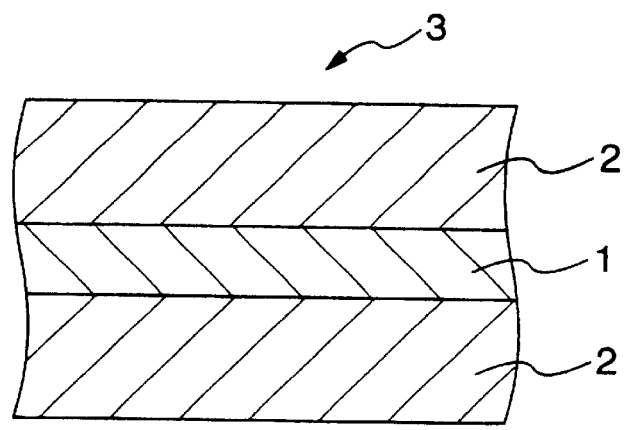
FIG. 1 is a schematic sectional view of a sintered nickel substrate in the Example of the present invention.

The sintered nickel substrate was dipped in an aqueous sodium hydroxide solution of a concentration of 25% and liquid temperature of 80° C. Then electrolysis was conducted by using the sintered substrate as the anode and placing a nickel plate opposite thereto as the cathode so as to give an electrolytic potential (vs. Ag/AgCl) of 0.3 V for 10 minutes, to form a nickel oxyhydroxide coating on the surface of the sintered nickel powder 2. Then, the substrate was washed thoroughly with water to remove the aqueous sodium hydroxide solution and then dried. Subsequently the substrate was dipped in an aqueous cobalt nitrate solution of a liquid temperature of 25° C., specific gravity of 1.05 and pH of 2 for 10 minutes, then thoroughly dried at 80° C., dipped in an aqueous sodium hydroxide solution of a liquid temperature of 80° C. and concentration of 25%, and further dried without removing the aqueous sodium hydroxide solution at 100° C. for 30 minutes. Thereafter the substrate was washed thoroughly with water to remove the aqueous sodium hydroxide solution and then dried. Thus, a sintered nickel substrate 3 in the Example of the present invention was prepared. FIG. 1 shows a schematic sectional view of the substrate 3.

In the steps of preparation of the sintered substrate 3 described above, the nickel oxyhydroxide coating, formed by anode-oxidation of the surface of the sintered nickel powder 2, attracts cobaltic acid ions present in the aqueous sodium hydroxide solution and participates in an oxidation-reduction reaction with the interposition of oxygen, and the coating is converted by reduction into a nickel hydroxide coating 4. Further, on the outside of the nickel hydroxide coating 4, a cobalt oxyhydroxide layer 5 having a high corrosion resistance is formed by the oxidation of cobalt hydroxide in the form of a uniform coating.

In the Example described above, an aqueous sodium hydroxide solution of a liquid temperature of 80° C. was used for the anode oxidation of the sintered nickel substrate. The liquid temperature is preferably in the range of 70–90° C. The anode oxidation was conducted at an electrolytic potential of 0.3 V (vs. Ag/AgCl) for 10 minutes. The electrolytic potential is preferably in the range of 0.1–0.5 V and the electrolytic time is preferably in the range of 5–30 minutes.

Figure 2:
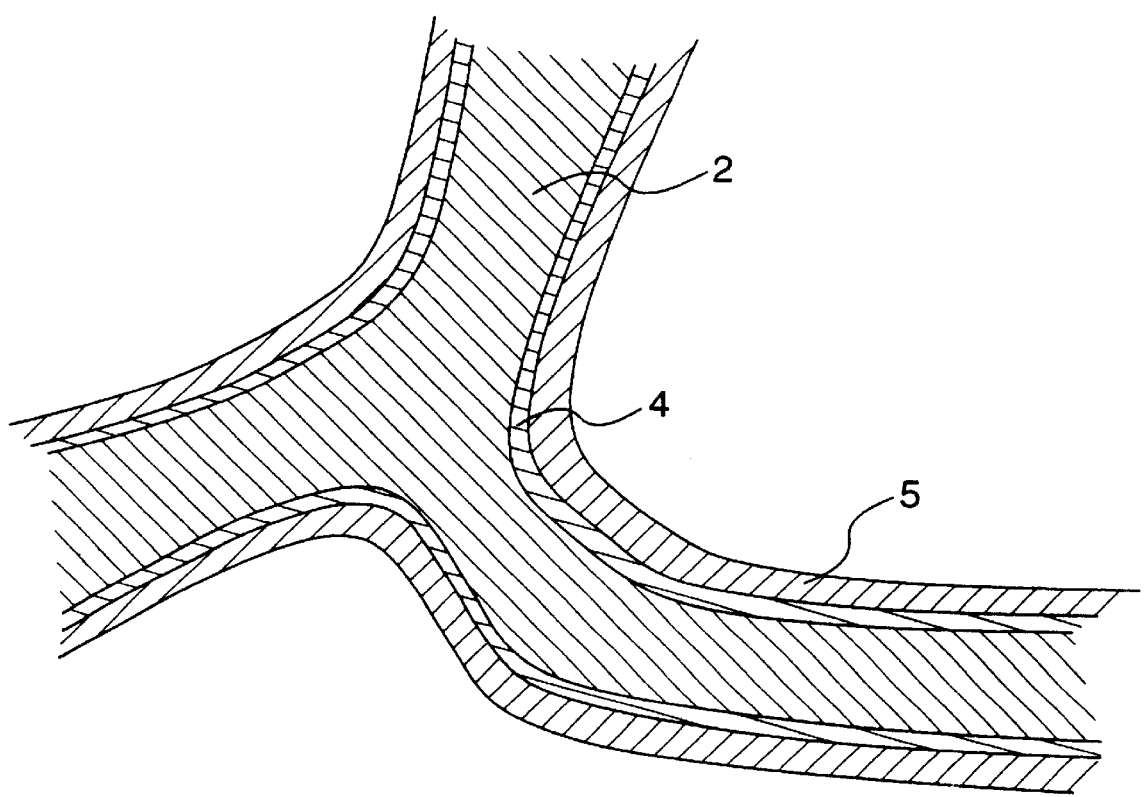
FIG. 2 is an enlarged schematic drawing showing the surface of the sintered nickel powder constituting the sintered nickel substrate in the Example of the present invention.

FIG. 2 shows an enlarged schematic view of a part of the sintered nickel powder 2 constituting the sintered nickel substrate 3.

As shown in FIG. 2, the surface of the sintered nickel powder 2 is covered with a nickel hydroxide coating 4, and further on the outside of the coating 4 is formed a cobalt oxyhydroxide layer 5 as a uniform film with no pinholes and no separation.

Examination of the sintered substrate 3 with a transmission electron microscope revealed that the thickness of the nickel hydroxide coating 4 mentioned above was 30 Å and the thickness of the cobalt oxyhydroxide layer 5 mentioned above was 0.08 μm.

Figure 3:
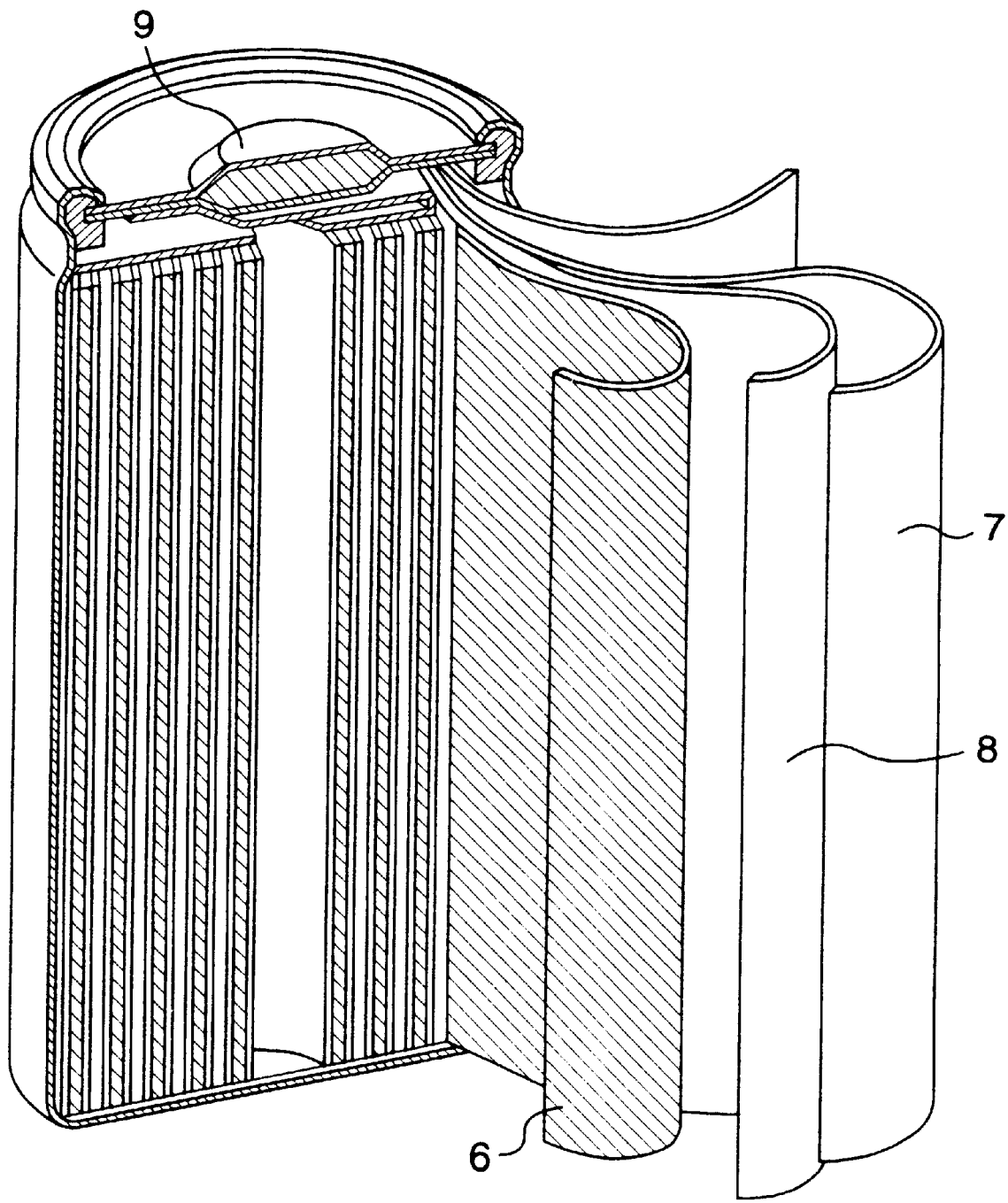
FIG. 3 is a partly sectional view of a nickel-cadmium storage battery in the Example of the present invention.

The sintered substrate 3 was subjected to a series of active material filling operations comprising dipping the substrate in an aqueous nickel nitrate solution of a liquid temperature of 80° C., specific gravity of 1.75 and pH of 1.5, drying it thoroughly at 80° C., then dipping it in an aqueous sodium hydroxide solution of a liquid temperature of 80° C. and a concentration of 25% to effect conversion of the nickel salt into nickel hydroxide of an active material, then washing it thoroughly with water to remove the alkali solution, followed by drying. The filling operation was conducted repeatedly 5 times, to prepare a nickel positive electrode 6. A nickel-cadmium storage battery 9 having a nominal capacity of 1.2 Ah was prepared from the positive electrode 6, a negative electrode 7 comprising cadmium as the main constituent material, a separator 8 and an alkaline electrolyte. A partial sectional view of the battery 9 is shown in FIG. 3.

Comparative Example 1

Figure 4:
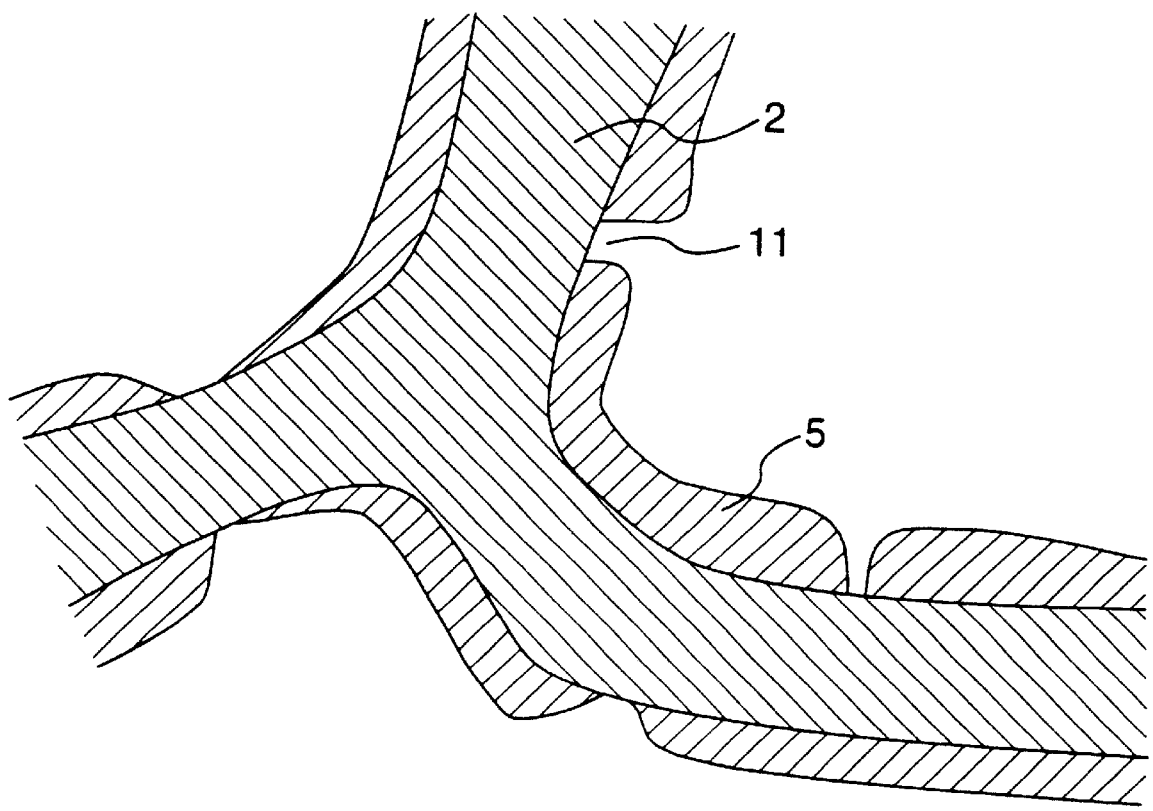
FIG. 4 is an enlarged schematic drawing showing the surface of the sintered nickel powder constituting a sintered nickel substrate in the Comparative Example.

A sintered nickel substrate with a porosity of about 85% obtained by sintering nickel powder in a reducing atmosphere was dipped in an aqueous cobalt nitrate solution of a liquid temperature of 25° C., specific gravity of 1.05 and pH of 2 for 10 minutes, thoroughly dried at 80° C., then dipped in an aqueous sodium hydroxide solution of a liquid temperature of 80° C. and concentration of 25%, and dried at 100° C. for 30 minutes without removing the aqueous sodium hydroxide solution. Then the substrate was washed thoroughly with water to remove the aqueous sodium hydroxide solution, and dried to obtain a sintered substrate. An enlarged schematic view of the surface of the sintered nickel powder 2 constituting the sintered substrate is shown in FIG. 4. As shown in FIG. 4, since cobalt hydroxide which had adhered unevenly to the surface of the sintered nickel 2 was converted into a cobalt oxyhydroxide layer 5 by heat treatment, pinholes 11 are present at those locations where cobalt hydroxide had not adhered.

The sintered substrate obtained above was subjected to the same series of active material filling operations as in the Example repeatedly 5 times to obtain a nickel positive electrode. A nickel-cadmium battery B with a nominal capacity of 1.2 Ah was prepared from the positive electrode obtained above, a negative electrode comprising cadmium as the main constituent material, a separator and an alkaline electrolyte.

Comparative Example 2

A sintered nickel substrate with a porosity of about 85% obtained by sintering nickel powder in a reducing atmosphere was dipped in an aqueous cobalt nitrate solution of a liquid temperature of 25° C., specific gravity of 1.30 and pH of 2 for 10 minutes, thoroughly dried at 80° C., then dipped in an aqueous sodium hydroxide solution of a liquid temperature of 80° C. and concentration of 25%, and dried at 100° C. for 30 minutes without removing the aqueous sodium hydroxide solution. Then the substrate was thoroughly washed with water to remove the aqueous sodium hydroxide solution and dried, to obtain a sintered substrate.

The sintered substrate was subjected to the same series of active material filling operations as in the Example repeatedly 5 times to obtain a nickel positive electrode. A nickel-cadmium storage battery C with a nominal capacity of 1.2 Ah was prepared from the positive electrode obtained above, a negative electrode comprising cadmium as the main constituent material, a separator and an alkaline electrolyte.

The sintered substrate obtained in the Example and the sintered substrates obtained in Comparative Examples 1 and 2 were respectively dipped in an aqueous cobalt nitrate solution of a liquid temperature of 80° C., specific gravity of 1.75 and pH of 1.5 and examined for the change of potential of the substrate with the duration of time. The results obtained are shown in FIG. 5.

Figure 5:
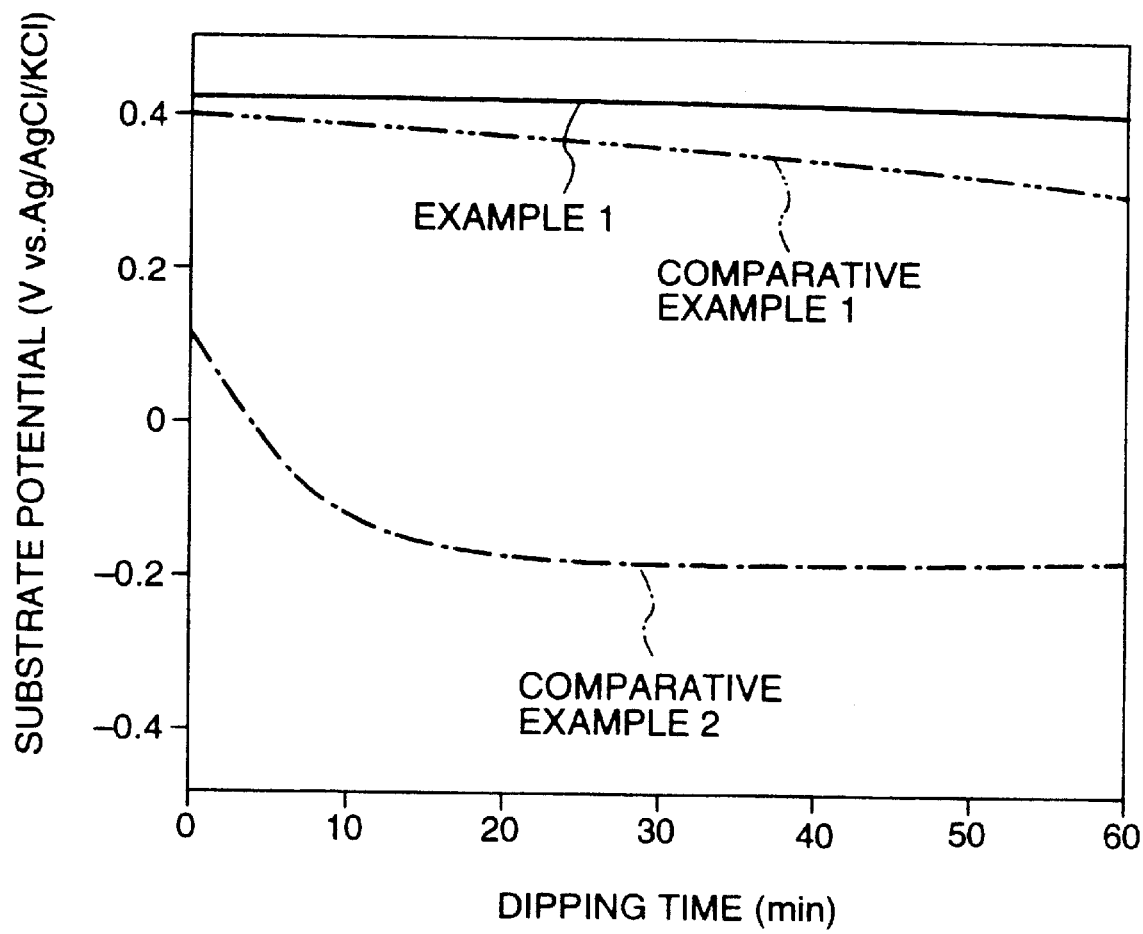
FIG. 5 is a graph showing the relationship between the dipping time and the substrate potential of a substrate dipped in an aqueous nickel nitrate solution.

As shown in FIG. 5, in the substrate of Comparative Example 1, the sintered nickel powder is corroded by the aqueous nickel nitrate solution infiltrating from pinholes, and the potential lowers sharply to the dissolution potential of nickel. This is because, as already shown in FIG. 4, the surface of the sintered nickel powders 2 is covered unevenly with the cobalt oxyhydroxide layer 5, leaving pinholes 11 in some parts of the surface.

It can be considered that, in the substrate of Comparative Example 2, the surface of the sintered nickel powder 2 is coated with a large amount of cobalt oxyhydroxide, leaving few pinholes, and hence the potential lowers very slowly. In the substrate according to the present invention, on the other hand, it can be considered that the surface of the sintered nickel powder is covered with a uniform nickel hydroxide coating 4 free from pinholes and further coated thereon with a cobalt oxyhydroxide layer 5, and hence the potential shows substantially no change.

The battery A obtained in the Example and the batteries B and C obtained in Comparative Examples 1 and 2 were respectively charged at a current of 1.2 A (1C) for 1.5 hours and then discharged until the terminal voltage reached 1.0 V, this charge-discharge cycle being termed one cycle, and the charge-discharge was done repeatedly. The change of discharge capacity of each of the batteries with the number of repeated charge-discharge cycles is shown in FIG. 6.

Figure 6:
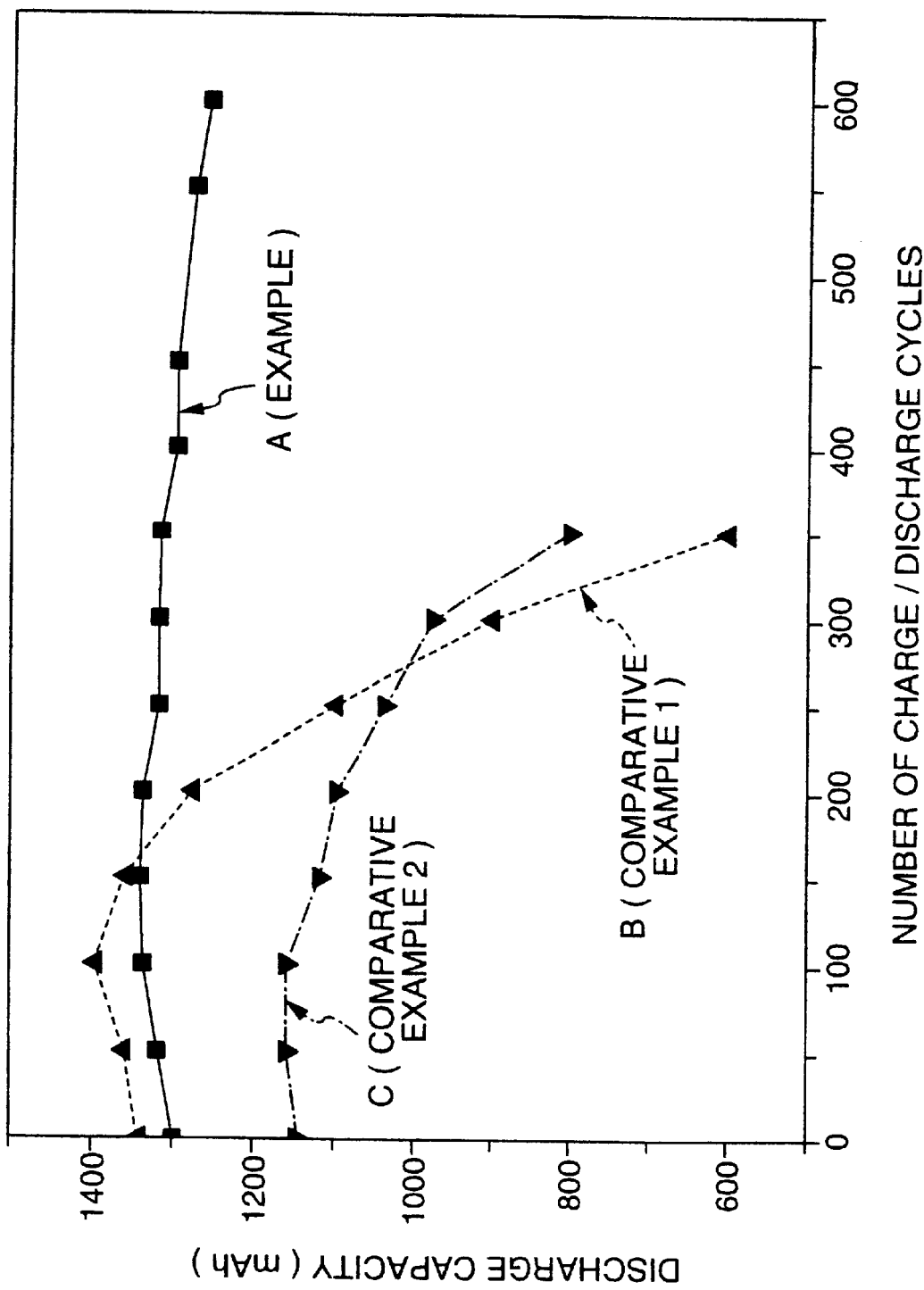
FIG. 6 is a graph showing the discharge capacity vs. the number of charge-discharge cycles of respective batteries.

As shown in FIG. 6, the battery B lowers its capacity sharply from about 150 cycles as the limit. The battery C also lowers the capacity sharply from about 350 cycles as the limit. On the contrary, the battery A of the present invention shows virtually no lowering of the voltage until 600 cycles.

These results can be interpreted as follows. In the batteries B and C of Comparative Examples, the sintered nickel substrate is corroded when dipped in a strongly acidic aqueous nickel nitrate solution and hence the mechanical strength of the sintered substrate is lowered. Therefore, when the charge and discharge are repeated, the corroded electrode is swollen as a result of the expansion and shrinkage of the active material. Accordingly, the pore volume of the positive electrode increases, and the electrolyte in the separator is taken into the enlarged pores to reduce the amount of electrolyte in the separator itself. As a result, the separator is exhausted of liquid, which results in increased electric resistance of the separator and a lowered discharge characteristic, and consequently the deterioration of the capacity in the charge-discharge cycles of the battery takes place. Further, the charge-discharge cycle characteristic has greatly changed with the progress of the corrosion of the nickel electrode.

In contrast, in the battery A of the present invention, the surface of the sintered nickel powder constituting the sintered substrate is covered with a nickel oxyhydroxide layer having a high corrosion resistance by subjecting the sintered nickel substrate to anode oxidation in an alkali solution. Therefore, the nickel skeleton of the sintered body can be prevented from corroding even in the step of forming the cobalt oxyhydroxide layer. Further, by subjecting the nickel oxyhydroxide layer obtained by the anode oxidation to a heat treatment without removing the aqueous alkali solution, the nickel oxyhydroxide is converted to nickel hydroxide through the oxidation-reduction reaction which proceeds with the interposition of cobaltic acid ions present in the aqueous sodium hydroxide solution and oxygen, and further on the outside of the nickel hydroxide layer, a cobalt oxyhydroxide layer having a high corrosion resistance is formed uniformly. As a result, a substrate having a high corrosion resistance can be obtained with a small amount of cobalt. By using the substrate having a high corrosion resistance, an alkaline storage battery has been obtained which undergoes no lowering of the operating voltage at the time of discharge and shows a good utilization of the active material.

In the sintered nickel substrate used in the Example described above, the surface of the nickel powder is covered with a nickel hydroxide coating 30 Å in thickness, and a cobalt oxyhydroxide layer 0.08 μm in thickness is further formed thereon. In the present invention, the thickness of the nickel hydroxide coating is preferably smaller than that of the cobalt oxyhydroxide layer, more preferably in the range of 10–100 Å. The thickness of the cobalt oxyhydroxide layer is preferably in the range of 0.05–0.2 μm.

The nickel hydroxide coating covering the surface of the sintered nickel powder constituting the sintered substrate used in the positive electrode of the battery of the Example changes cyclically into nickel hydroxide and nickel oxyhydroxide by the charge and discharge of the battery.

What is claimed is:

1. A sintered nickel porous plaque substrate for alkaline storage batteries, said porous plaque substrate comprising:
    (a) a sintered nickel skeleton:
    (b) a nickel hydroxide coating having a first surface and a second surface, said first surface in contact with said sintered nickel skeleton, and said coating disposed on the entire surface of the sintered nickel substrate; and
    (c) a cobalt oxyhydroxide layer disposed on said second surface of the nickel hydroxide coating.

2. A nickel positive electrode for alkaline storage batteries, said electrode comprising a porous plaque substrate comprising a sintered nickel skeleton, a nickel hydroxide coating having a first surface and a second surface, said first surface in contact with said sintered nickel skeleton; and said coating disposed on the entire surface of the sintered nickel skeleton; and a cobalt oxyhydroxide layer disposed on said second surface of the nickel hydroxide coatings,
    said nickel positive electrode produced by a process comprising the active material filling steps of:
    (a) dipping said porous plague substrate in an acidic aqueous nickel salt solution;
    (b) drying said porous plague substrate having an acidic aqueous nickel salt solution thereon; and
    (c) dipping said dried porous plaque substrate in an aqueous alkali solution to effect conversion of the nickel salt into nickel hydroxide.

3. An alkaline storage battery comprising a nickel positive electrode, a negative electrode, a separator, and an alkaline electrolyte, said positive electrode comprising a sintered nickel porous plaque substrate and an active material filled thereinto, said porous plaque substrate comprising:

(a) a sintered nickel skeleton;

(b) a nickel hydroxide coating having a first surface and a second surface, said first surface in contact with said sintered nickel skeleton; and said coating disposed on the entire surface of the sintered nickel skeleton; and (c) a cobalt oxyhydroxide layer disposed on said second surface of the nickel hydroxide coating.

4. The alkaline storage battery according to claim 3, wherein said cobalt oxyhydroxide layer is disposed on the entire second surface of the nickel hydroxide coating.

5. The alkaline storage battery according to claim 3 wherein the thickness of the nickel hydroxide coating is smaller than the thickness of the cobalt oxyhydroxide layer.

6. The alkaline storage battery according to claim 5 wherein the thickness of the nickel hydroxide coating is in the range of 10–100 Å and the thickness of the cobalt oxyhydroxide layer is in the range of 0.05–0.2 μm.

7. An alkaline storage battery comprising a nickel positive electrode, a negative electrode, a separator, and an alkaline electrolyte, said positive electrode comprising a sintered nickel porous plaque substrate and an active material filled thereinto, said porous plaque substrate comprising a sintered nickel skeleton; a nickel hydroxide coating having a first surface and a second surface, said first surface in contact with said sintered nickel skeleton; and a cobalt oxyhydroxide layer disposed on said second surface of the nickel hydroxide coating, said porous plaque substrate produced by a process comprising the steps of:

(a) subjecting said sintered nickel skeleton to anode oxidation in an aqueous alkali solution to form a nickel oxyhydroxide coating on the second surface of the sintered nickel skeleton;

(b) attaching a cobalt salt to the surface of said nickel oxyhydroxide coating; and (c) while subjecting said cobalt salt to an alkali conversion treatment to form a cobalt hydroxide, through an oxidation-reduction reaction between said nickel oxyhydroxide coating and said cobalt hydroxide, converting said nickel oxyhydroxide coating into said nickel hydroxide coating, and forming said cobalt oxyhydroxide layer.

8. The alkaline storage battery according to claim 7, wherein said nickel hydroxide coating is disposed on the entire surface of the sintered nickel skeleton, and said cobalt oxyhydroxide layer is disposed on the entire second surface of the nickel hydroxide coating.

9. The alkaline storage battery according to claim 7 wherein the thickness of the nickel hydroxide coating is smaller than that of the cobalt oxyhydroxide layer.

10. The alkaline storage battery according to claim 1 wherein the thickness of the nickel hydroxide coating is in the range of 10–100 Å and the thickness of the cobalt oxyhydroxide layer is in the range of 0.05–0.2 μm.

11. An alkaline storage battery comprising a nickel positive electrode, a negative electrode, a separator; and an alkaline electrolyte, said positive electrode comprising a sintered nickel porous plaque substrate and an active material filled thereinto, said porous plaque substrate comprising:

(a) a sintered nickel skeleton;

(b) a nickel hydroxide coating having a first surface and a second surface, said first surface in contact with said sintered nickel substrate, and said coating disposed on the entire surface of the sintered nickel skeleton; and (c) a cobalt oxyhydroxide layer disposed on said second surface of the nickel hydroxide coating, wherein said nickel hydroxide coating is cyclically converted into nickel hydroxide and nickel oxyhydroxide by the charge and discharge of the battery.

12. The alkaline storage battery according to claim 11, wherein said nickel hydroxide coating is disposed on the entire surface of the sintered nickel skeleton, and said cobalt oxyhydroxide layer is disposed on the entire second surface of the nickel hydroxide coating.

13. The alkaline storage battery according to claim 11 wherein the thickness of the nickel hydroxide coating is smaller than that of the cobalt oxyhydroxide layer.

14. The alkaline storage battery according to claim 13 wherein the thickness of the nickel hydroxide coating is in the range of 10–100 Å and the thickness of the cobalt oxyhydroxide layer is in the range of 0.05–0.2 μm.

15. A process for producing a sintered nickel porous plaque substrate for alkaline storage batteries, said porous plaque substrate comprising a sintered nickel skeleton; a nickel hydroxide coating having a first surface and a second surface, said first surface in contact with said sintered nickel skeleton, and a cobalt oxyhydroxide layer disposed on said second surface of the nickel hydroxide coating, said process comprising the steps of:

(a) subjecting said sintered nickel skeleton to anode oxidation in an aqueous alkali solution to form a nickel oxyhydroxide coating on the second surface of the sintered nickel skeleton;

(b) attaching a cobalt salt to the surface of said nickel oxyhydroxide coating; and (c) while subjecting said cobalt salt to an alkali conversion treatment to form a cobalt hydroxide, through an oxidation-reduction reaction between said nickel oxyhydroxide coating and said cobalt hydroxide, converting said nickel oxyhydroxide coating into said nickel hydroxide coating, and forming said cobalt oxyhydroxide layer.

16. The process for producing a sintered nickel substrate for alkaline storage batteries according to claim 15 wherein the anode oxidation is conducted in an aqueous alkali solution of a liquid temperature in the range of 70–90° C.

17. The process for producing a sintered nickel substrate for alkaline storage batteries according to claim 15 wherein the node oxidation is conducted by electrolysis using the sintered substrate as the anode and a nickel plate as the cathode at an electrolytic potential (vs. Ag/AgCl) of 0.1–0.5 V for 5–30 minutes.

18. A sintered nickel porous plaque substrate according to claim 1, wherein the thickness of the nickel hydroxide coating is less than the thickness of the cobalt oxyhydroxide layer.

19. A nickel positive electrode according to claim 2, wherein the thickness of the nickel hydroxide coating is less than the thickness of the cobalt oxyhydroxide layer.

* * * * *